US007761743B2

(12) United States Patent
Talaugon et al.

(10) Patent No.: US 7,761,743 B2
(45) Date of Patent: Jul. 20, 2010

(54) FAULT TOLERANT ROUTING IN A NON-HOT-STANDBY CONFIGURATION OF A NETWORK ROUTING SYSTEM

(75) Inventors: Wilson Talaugon, Union City, CA (US); Sridhar Subramaniam, Cupertino, CA (US); Bill Chin, Belmont, CA (US); Itai Aaronson, Belmont, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 12/554,977

(22) Filed: Sep. 7, 2009

(65) Prior Publication Data

US 2010/0011245 A1    Jan. 14, 2010

Related U.S. Application Data

(63) Continuation of application No. 11/849,298, filed on Sep. 3, 2007, now Pat. No. 7,587,633, which is a continuation of application No. 11/466,098, filed on Aug. 21, 2006, now Pat. No. 7,278,055, which is a continuation of application No. 10/232,979, filed on Aug. 29, 2002, now Pat. No. 7,096,383.

(51) Int. Cl.
*G06F 11/00* (2006.01)
(52) U.S. Cl. ....................................................... 714/21
(58) Field of Classification Search ............... 714/2–12, 714/15, 16, 20, 21, 25, 26, 31, 37–39
See application file for complete search history.

(56) References Cited

U.S. PATENT DOCUMENTS

| 4,667,287 | A |   | 5/1987  | Allen et al. |        |
|-----------|---|---|---------|--------------|--------|
| 5,473,599 | A | * | 12/1995 | Li et al.    | 370/219 |
| 5,490,252 | A |   | 2/1996  | Macera et al. |       |
| 5,581,705 | A |   | 12/1996 | Passint et al. |      |
| 5,592,610 | A | * | 1/1997  | Chittor      | 714/4  |
| 5,633,866 | A |   | 5/1997  | Callon       |        |
| 5,745,778 | A |   | 4/1998  | Alfieri      |        |

(Continued)

OTHER PUBLICATIONS

Chan, Mun C. et al., "An architecture for broadband virtual networks under customer control." IEEE Network Operations and Management Symposium. Apr. 1996. pp. 135-144.

(Continued)

*Primary Examiner*—Nadeem Iqbal
(74) *Attorney, Agent, or Firm*—Hamilton, DeSanctis & Cha LLP

(57) ABSTRACT

Methods and systems for facilitating fault tolerance in a non-hot-standby configuration of a network routing system are provided. According to one embodiment, a method is provided for replacing an active processing engine with a non-hot-standby processing engine. Multiple processing engines within a network routing system are configured. The processing engines include an active processing engine having one or more software contexts, representative of a set of objects implementing a virtual router, for example, and a non-hot-standby processing engine having no pre-created software contexts corresponding to the one or more software contexts. Responsive to determining a fault associated with the active processing engine, the active processing engine is dynamically replaced with the non-hot-standby processing engine by creating replacement software contexts within the non-hot-standby processing engine corresponding to the one or more software contexts.

20 Claims, 13 Drawing Sheets

U.S. PATENT DOCUMENTS

| | | | |
|---|---|---|---|
| 5,825,772 A | 10/1998 | Dobbins et al. | |
| 5,841,973 A | 11/1998 | Kessler et al. | |
| 5,841,990 A | 11/1998 | Picazzo et al. | |
| 5,892,924 A | 4/1999 | Lyon et al. | |
| 5,920,705 A | 7/1999 | Lyon et al. | |
| 5,963,555 A | 10/1999 | Takase et al. | |
| 5,964,847 A | 10/1999 | Booth et al. | |
| 5,987,521 A | 11/1999 | Arrowood et al. | |
| 6,014,382 A | 1/2000 | Takihiro et al. | |
| 6,032,193 A | 2/2000 | Sullivan | |
| 6,047,330 A | 4/2000 | Stracke | |
| 6,069,895 A | 5/2000 | Ayandeh | |
| 6,098,110 A | 8/2000 | Witowski et al. | |
| 6,101,327 A * | 8/2000 | Holte-Rost et al. | 717/170 |
| 6,118,791 A | 9/2000 | Fichou et al. | |
| 6,137,777 A | 10/2000 | Vaid et al. | |
| 6,169,793 B1 | 1/2001 | Isoyama | |
| 6,175,867 B1 | 1/2001 | Taghadoss | |
| 6,220,768 B1 | 4/2001 | Barroux | |
| 6,226,296 B1 | 5/2001 | Lindsey et al. | |
| 6,226,788 B1 | 5/2001 | Schoening et al. | |
| 6,243,580 B1 | 6/2001 | Garner | |
| 6,249,519 B1 | 6/2001 | Rangachar | |
| 6,256,295 B1 | 7/2001 | Callon | |
| 6,260,072 B1 | 7/2001 | Rodriguez | |
| 6,260,073 B1 | 7/2001 | Walker et al. | |
| 6,266,695 B1 | 7/2001 | Huang et al. | |
| 6,278,708 B1 | 8/2001 | Von Hammerstein et al. | |
| 6,286,038 B1 | 9/2001 | Reichmeyer et al. | |
| 6,295,297 B1 | 9/2001 | Lee | |
| 6,317,748 B1 | 11/2001 | Menzies et al. | |
| 6,330,602 B1 | 12/2001 | Law et al. | |
| 6,338,092 B1 | 1/2002 | Chao et al. | |
| 6,405,262 B1 * | 6/2002 | Vogel et al. | 719/315 |
| 6,424,657 B1 | 7/2002 | Voit et al. | |
| 6,434,619 B1 | 8/2002 | Lim et al. | |
| 6,449,650 B1 | 9/2002 | Westfall et al. | |
| 6,453,406 B1 | 9/2002 | Sarnikowski et al. | |
| 6,459,682 B1 | 10/2002 | Ellesson et al. | |
| 6,463,061 B1 | 10/2002 | Rekhter et al. | |
| 6,466,976 B1 | 10/2002 | Alles et al. | |
| 6,496,935 B1 | 12/2002 | Fink et al. | |
| 6,526,056 B1 | 2/2003 | Rehkter et al. | |
| 6,532,088 B1 | 3/2003 | Dantu et al. | |
| 6,542,466 B1 | 4/2003 | Pashtan et al. | |
| 6,542,515 B1 | 4/2003 | Kumar et al. | |
| 6,556,544 B1 | 4/2003 | Lee | |
| 6,597,956 B1 | 7/2003 | Aziz et al. | |
| 6,608,816 B1 | 8/2003 | Nichols | |
| 6,611,498 B1 | 8/2003 | Baker et al. | |
| 6,611,522 B1 | 8/2003 | Zheng et al. | |
| 6,625,169 B1 | 9/2003 | Tofano | |
| 6,631,519 B1 | 10/2003 | Nicholson et al. | |
| 6,635,014 B2 * | 10/2003 | Starkweather et al. | 600/300 |
| 6,636,516 B1 | 10/2003 | Yamano | |
| 6,638,516 B1 | 10/2003 | Yamano | |
| 6,639,897 B1 | 10/2003 | Shiomoto et al. | |
| 6,658,013 B1 | 12/2003 | de Boer et al. | |
| 6,668,282 B1 | 12/2003 | Booth et al. | |
| 6,697,359 B1 | 2/2004 | George | |
| 6,697,360 B1 | 2/2004 | Gai et al. | |
| 6,738,371 B1 | 5/2004 | Ayres | |
| 6,763,236 B2 | 7/2004 | Siren | |
| 6,775,267 B1 | 8/2004 | Kung et al. | |
| 6,775,284 B1 | 8/2004 | Calvignac et al. | |
| 6,807,181 B1 | 10/2004 | Weschler | |
| 6,816,462 B1 | 11/2004 | Booth et al. | |
| 6,856,676 B1 | 2/2005 | Pirot et al. | |
| 6,868,082 B1 | 3/2005 | Allen et al. | |
| 6,922,774 B2 | 7/2005 | Meushaw et al. | |
| 6,938,097 B1 | 8/2005 | Vincent | |
| 6,944,168 B2 | 9/2005 | Paatela et al. | |
| 6,954,429 B2 | 10/2005 | Horton et al. | |
| 6,959,194 B2 | 10/2005 | Brouwer et al. | |
| 6,971,044 B2 * | 11/2005 | Geng et al. | 714/11 |
| 6,985,438 B1 | 1/2006 | Tschudin | |
| 6,985,956 B2 | 1/2006 | Luke et al. | |
| 7,010,715 B2 * | 3/2006 | Barbas et al. | 714/4 |
| 7,020,143 B2 | 3/2006 | Zdan | |
| 7,042,843 B2 | 5/2006 | Ni | |
| 7,042,848 B2 | 5/2006 | Santiago et al. | |
| 7,054,291 B2 | 5/2006 | Balazinski et al. | |
| 7,054,311 B2 | 5/2006 | Norman et al. | |
| 7,058,716 B1 | 6/2006 | Sundaresan et al. | |
| 7,068,656 B2 | 6/2006 | Sainomoto et al. | |
| 7,079,481 B2 * | 7/2006 | Kramer | 370/218 |
| 7,082,477 B1 | 7/2006 | Sadhasivam et al. | |
| 6,173,399 B1 | 8/2006 | Gilbrech | |
| 7,089,293 B2 | 8/2006 | Grosner et al. | |
| 7,096,383 B2 | 8/2006 | Talaugon et al. | |
| 7,096,495 B1 | 8/2006 | Warrier et al. | |
| 7,116,679 B1 | 10/2006 | Ghahremani | |
| 7,117,241 B2 * | 10/2006 | Bloch et al. | 709/201 |
| 7,127,049 B2 | 10/2006 | Godse et al. | |
| 6,298,130 B1 | 12/2006 | Galvin | |
| 7,159,035 B2 | 1/2007 | Garcia-Luna Aceves et al. | |
| 7,161,904 B2 | 1/2007 | Hussain et al. | |
| 6,944,128 B2 | 3/2007 | Nichols | |
| 7,187,676 B2 | 3/2007 | DiMambro | |
| 7,197,553 B2 | 3/2007 | Roberts et al. | |
| 7,225,259 B2 | 5/2007 | Ho et al. | |
| 7,266,120 B2 | 9/2007 | Cheng et al. | |
| 7,272,643 B1 * | 9/2007 | Sarkar et al. | 709/222 |
| 7,278,055 B2 | 10/2007 | Talaugon et al. | |
| 7,313,614 B2 | 12/2007 | Considine et al. | |
| 7,324,489 B1 | 1/2008 | Iyer | |
| 7,463,633 B2 | 12/2008 | Endo et al. | |
| 7,587,633 B2 | 9/2009 | Talaugon et al. | |
| 7,639,632 B2 | 12/2009 | Sarkar et al. | |
| 2001/0024425 A1 | 9/2001 | Tsunoda et al. | |
| 2001/0033580 A1 | 10/2001 | Dorsey et al. | |
| 2001/0034733 A1 | 10/2001 | Prompt et al. | |
| 2001/0043571 A1 | 11/2001 | Jang et al. | |
| 2001/0052013 A1 | 12/2001 | Munguia et al. | |
| 2002/0071389 A1 | 6/2002 | Seo | |
| 2002/0075901 A1 | 6/2002 | Perlmutter et al. | |
| 2002/0099849 A1 | 7/2002 | Alfieri et al. | |
| 2002/0150093 A1 | 10/2002 | Ott et al. | |
| 2002/0150114 A1 | 10/2002 | Sainomoto et al. | |
| 2002/0152373 A1 | 10/2002 | Sun et al. | |
| 2002/0186661 A1 | 10/2002 | Santiago et al. | |
| 2003/0012209 A1 | 1/2003 | Abdelilah et al. | |
| 2003/0033401 A1 | 2/2003 | Poisson et al. | |
| 2003/0063590 A1 | 4/2003 | Mohan et al. | |
| 2003/0108041 A1 | 6/2003 | Aysan et al. | |
| 2003/0115308 A1 | 6/2003 | Best et al. | |
| 2003/0117954 A1 | 6/2003 | De Neve et al. | |
| 2003/0128663 A1 * | 7/2003 | Kramer | 370/222 |
| 2003/0169747 A1 | 9/2003 | Wang | |
| 2003/0200295 A1 | 10/2003 | Roberts et al. | |
| 2003/0212735 A1 | 11/2003 | Hicok et al. | |
| 2003/0223406 A1 | 12/2003 | Balay | |
| 2004/0037279 A1 | 2/2004 | Zeliger | |
| 2004/0141521 A1 | 7/2004 | George | |
| 2004/0160900 A1 | 10/2004 | Lund et al. | |
| 2004/0199567 A1 | 10/2004 | Lund | |
| 2004/0199568 A1 | 10/2004 | Lund | |
| 2004/0199569 A1 | 10/2004 | Kalkunte et al. | |
| 2005/0002417 A1 | 1/2005 | Kelly et al. | |
| 2005/0081059 A1 | 4/2005 | Bandini et al. | |
| 2005/0083955 A1 | 4/2005 | Guichard et al. | |
| 2005/0108340 A1 | 5/2005 | Gleeson et al. | |
| 2005/0243798 A1 | 11/2005 | Dunn et al. | |
| 2006/0087969 A1 | 4/2006 | Santiago et al. | |

| | | | |
|---|---|---|---|
| 2006/0206713 | A1 | 9/2006 | Hickman et al. |
| 2008/0028456 | A1 | 1/2008 | O'Rourke et al. |
| 2008/0259936 | A1 | 10/2008 | Hussain et al. |
| 2008/0317040 | A1 | 12/2008 | Balay et al. |
| 2008/0317231 | A1 | 12/2008 | Balay et al. |
| 2008/0320553 | A1 | 12/2008 | Balay et al. |
| 2009/0007228 | A1 | 1/2009 | Balay et al. |
| 2009/0073977 | A1 | 3/2009 | Hussain et al. |
| 2009/0131020 | A1 | 5/2009 | van de Groenendaal |
| 2009/0225759 | A1 | 9/2009 | Hussain et al. |
| 2009/0238181 | A1 | 9/2009 | Desai et al. |
| 2009/0279567 | A1 | 11/2009 | Ta et al. |
| 2010/0094980 | A1 | 4/2010 | Sarkar et al. |

OTHER PUBLICATIONS

Chan, Mun C. et al "Customer Management and Control of Broadband VPN Services." Proc. Fifth IFIP/IEEE International Symposium of Integrated Network Management. May 1997. pp. 301-314.

Gasparro, D.M., "Next-Gen VPNs: The Design Challenge." Data Communications. Sep. 1999. pp. 83-95.

Hanaki, M. et al., "LAN/WAN management integration using ATM CNM interface." IEEE Network Operations Management Symposium, vol. 1, Apr. 1996. pp. 12-21.

Kapustka, S., "CoSine Communications Move VPNs 'Into the Cloud' with the Leading Managed IP Service Delivery Platform." http://wwwcosinecom.com/news/pr_5_24.html. Press Release, CoSine Communications. 1995. p. 5.

Keshav, S., "An Engineering Approach to Computer Networking: ATM networks, the internet, and the telephone network." Reading Mass: Addison-Wesley, Addison-Wesley Professional Computing Series. 1992. pp. 318-324.

Kim, E.C. et al., "The Multi-Layer VPN Management Architecture." Proc. Sixth IFIP/IEEE International Symposium on Integrated Network Management. May 1999. pp. 187-200.

Rao, J.R., Intranets and VPNs: Strategic Approach. 1988 Annual Review of Communications. 1998. pp. 669-674.

Tanenbaum, A.S., "Computer Networks." Upper Saddle River, N.J.: Prentice Hall PTR, 3rd Edition. 1996. pp. 348-364.

European Search Report for PCT/US03/37009 (Jul. 4, 2004) 2 pgs.

International Search Report for PCTUS03/17674. 6 pgs.

Office Action dated Nov. 28, 2007 for U.S. Appl. No. 09/952,520.

Office Action dated Oct. 16, 2007 for U.S. Appl. No. 09/661,130.

Office Action dated Oct. 18, 2007 for U.S. Appl. No. 09/663,483.

IEEE Potentials Publication; "Local Area Networks" Dec. 1995/Jan. 1996; pp. 6. http://www.ece.uc.edu/-paw/potentials/sample.

Lawrence, J. Lang et al. "Connecting Remote FDDI Installations with Single-Mode Fiber, Dedicated Lines, or SMDS." Jul. 1990; ACM SIGCOMM Computer Communication Review. vol. 20, Issue 3; pp. 72-82.

Non-Final Office Action for U.S. Appl. No. 11/849,352 mailed Jul. 17, 2009.

Non-Final Office Action for U.S. Appl. No. 10/991,970 mailed May 18, 2009.

Non-Final Office Action for U.S. Appl. No. 10/991,969 mailed Apr. 27, 2009.

Non-Final Office Action for U.S. Appl. No. 11/684,614 mailed Apr. 24, 2009.

Non-Final Rejection for U.S. Appl. No. 12/123,443 mailed Jan. 27, 2010.

Non-Final Rejection for U.S. Appl. No. 10/991,970 mailed Jan. 12, 2010.

Non-Final Rejection for U.S. Appl. No. 10/991,970 mailed Dec. 31, 2009.

Non-Final Rejection for U.S. Appl. No. 12/202,232 mailed Mar. 23, 2010.

Non-Final Rejection for U.S. Appl. No. 12/202,223 mailed Mar. 3, 2010.

Non-Final Rejection for U.S. Appl. No. 12/260,524 mailed Mar. 17, 2010.

Non-Final Rejection for U.S. Appl. No. 12/259,296 mailed Mar. 9, 2009.

Non-Final Rejection for U.S. Appl. No. 12/202,224 mailed on Apr. 16, 2010.

Non-Final Rejection for U.S. Appl. No. 12/140,249 mailed on Mar. 31, 2010.

Final Rejection for U.S. Appl. No. 11/530,901 mailed Sep. 1, 2009.

Final Rejection for U.S. Appl. No. 11/616,243 mailed Sep. 15, 2009.

Final Rejection for U.S. Appl. No. 11/537,609 mailed Nov. 17, 2009.

* cited by examiner

```
CHASSIS INFORMATION
xxxxx
- - - - - - - - - - - - - - - - - - - - - - - -
BLADE INFORMATION
xxxxx (blade #1)
...
xxxxx (blade #n)
- - - - - - - - - - - - - - - - - - - - - - - -
VPN INFORMATION
xxxxx (vpn 1)
    VR INFORMATION
    xxxxx (vr a.b.c.d.)
        VI INFORMATION
        xxxxx (vi #1)
        ...
        xxxxx (vi #n)
        ...
    xxxxx (vr e.f.g.h.)
        xxxxx
- - - - - - - - - - - - - - - - - - - - - - - -
```

Fig.8

FAULT TOLERANT ROUTING IN A NON-HOT-STANDBY CONFIGURATION OF A NETWORK ROUTING SYSTEM

CROSS-REFERENCE TO RELATED APPLICATIONS

This application is a continuation of U.S. application Ser. No. 11/848,298, filed on Sep. 3, 2007, which is a continuation of U.S. application Ser. No. 11/466,098, filed on Aug. 21, 2006, now U.S. Pat. No. 7,278,055, which is a continuation of U.S. application Ser. No. 10/232,979, filed on Aug. 29, 2002, now U.S. Pat. No. 7,096,383, all of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2002-2009, Fortinet, Inc.

BACKGROUND

1. Field

Embodiments of the present invention generally relate to data communications. In particular, embodiments of the present invention relate to network routing and routing systems, and more particularly to fault-tolerant routing.

2. Description of the Related Art

It is desirable to provide reliable packet delivery between nodes in the network connected by a functional physical path. Interconnected networks vary in the number of redundant paths they provide between nodes. Many conventional routing systems use an active replication technique to provide for failures. With active replication, recovery from failures may be quick, but there is a large overhead in ordinary execution. Active replication uses a redundant structure consisting of two processor resources (e.g., two processors and memory). One problem with active replication is that because all the replicas must be pre-created when the system is running, the processor resources are used wastefully. Another problem with active replication is that because it complicates object management, flexible management and flexible construction are difficult.

Thus, there is a need for systems and methods that provide reliable packet delivery between all pairs of nodes. There is also a need for systems and methods that detect when a fault has occurred and alert the operating system. There is also a need for systems and methods that provide a mechanism to reconfigure a network around faulty areas to ensure quick and reliable packet delivery to all non-faulty areas of the network. There is also a need for systems and methods that are able to reconfigure a network within a short period of time after a failure. There is also a need for systems and methods that provide quick recovery from failure, do not require extra or dedicated hardware as in a hot-standby configuration, and provide for fault tolerant routing without the need to reboot.

SUMMARY

Methods and systems are described for facilitating fault tolerance in a non-hot-standby configuration of a network routing system. According to one embodiment, a method is provided for replacing an active processing engine with a non-hot-standby processing engine. Multiple processing engines within a network routing system are configured. The processing engines include an active processing engine having one or more software contexts and a non-hot-standby processing engine having no pre-created software contexts corresponding to the one or more software contexts. Responsive to determining a fault associated with the active processing engine, the active processing engine is dynamically replaced with the non-hot-standby processing engine by creating replacement software contexts within the non-hot-standby processing engine corresponding to the one or more software contexts.

In the aforementioned embodiment, the fault may represent a link failure to or from the active processing engine.

In various instances of the aforementioned embodiments, the fault may represent a hardware or software failure associated with the active processing engine.

In the context of various of the aforementioned embodiments, one of the one or more software contexts may include a set of objects implementing a virtual router (VR).

In various instances of the aforementioned embodiments, dynamically replacing the active processing engine with the non-hot-standby processing engines may involve use of a network-management protocol.

In the context of various of the aforementioned embodiments, the network-management protocol may be Simple Network Management Protocol (SNMP).

In some implementations, the fault may be detected by a control blade of the network routing system.

In situations in which the fault is detected by a control blade, the control blade may actively monitor the health of the active processing engine by tracking keep-alive messages received from the active processing engine.

In the context of various of the aforementioned embodiments, dynamically replacing the active processing engine with the non-hot-standby processing engine may involve the use of a transaction-based commit model.

In various instances, the active processing engine and the non-hot-standby processing engine are substantially identical processing engines.

Other embodiments of the present invention provide another method of replacing an active processing engine with a non-hot-standby processing engine. Responsive to determining the existence of a failed processing engine of a network routing system, one or more software contexts that were associated with the failed processing engine prior to failure of the failed processing engine are identified. Then, the failed processing engine is dynamically replaced with a non-hot-standby processing engine by configuring the non-hot-standby processing engine with one or more replacement software contexts corresponding to the one or more software contexts. Notably, prior to the failure, the non-hot-standby processing engine is in a state in which the non-hot-standby processing engine can replace one or more of the processing engines of the network routing system and is not being actively synchronized with the failed processing engine.

In the aforementioned embodiment, one of the one or more software contexts may include a set of objects implementing a virtual router (VR).

In the aforementioned embodiment, a fault indicative of failure of the failed processing engine may be failure of the VR.

In various instances of the aforementioned embodiments, the fault may be detected by a control blade of the network routing system.

Other embodiments of the present invention provide a computer-readable storage medium tangibly embodying a set of instructions. When the instructions are executed by one or more processors associated with a control blade of a network routing system and/or processing engines of the network routing engine cause the one or more processors to perform a method of replacing an active processing engine with a non-hot-standby processing engine. The processing engines, including an active processing engine having one or more software contexts and a non-hot-standby processing engine having no pre-created software contexts corresponding to the one or more software contexts, are configured. Then, responsive to determining a fault associated with the active processing engine, the active processing engine is dynamically replaced with the non-hot-standby processing engine by creating replacement software contexts within the non-hot-standby processing engine corresponding to the one or more software contexts.

In the aforementioned embodiment, the fault may involve a link failure to or from the active processing engine.

In the context of various of the aforementioned embodiments, the fault may involve a hardware or software failure associated with the active processing engine.

In various instances of the aforementioned embodiments, one of the one or more software contexts may include a set of objects implementing a virtual router (VR).

In some implementations, the fault may be detected by the control blade.

In the aforementioned embodiment, the control blade may monitor the health of the active processing engine by tracking keep-alive messages received from the active processing engine.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 8 illustrates the layout of the ASCII-text configuration in accordance with an embodiment of the present invention;

DETAILED DESCRIPTION

Figure 1:
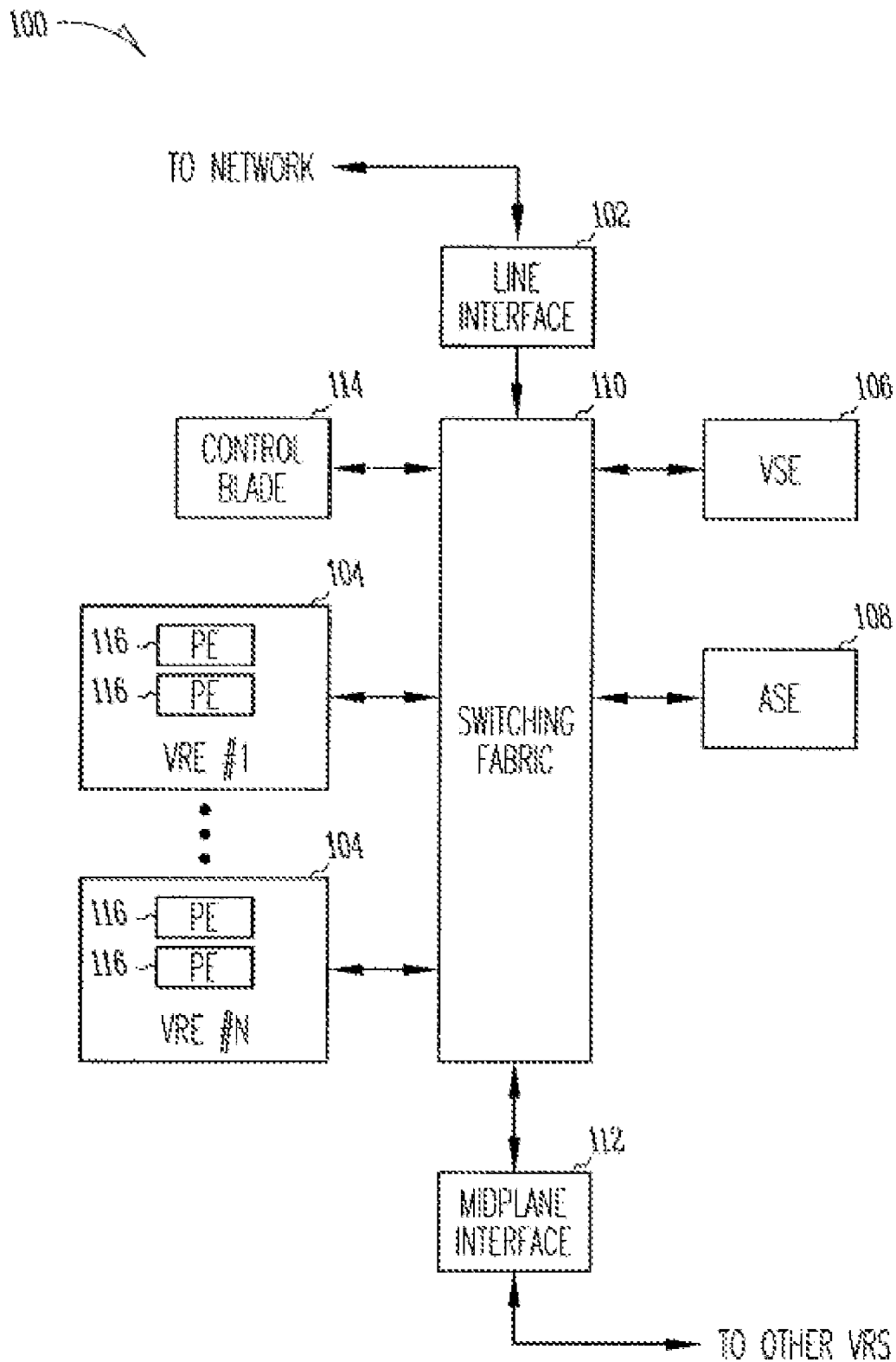
FIG. 1 is a simplified functional block diagram of a network routing system in accordance with an embodiment of the present invention.

Methods and systems are described for passive replication to facilitate fault tolerance in a network routing system. In one embodiment, a virtual routing system and method provides reliable packet delivery between all pairs of nodes. In another embodiment, a virtual routing system and method detects when a fault has occurred, and alert the operating system. In another embodiment, a virtual routing system and method reconfigures the network around faulty areas of network to ensure quick and reliable packet delivery to all non-faulty areas of the network. In yet another embodiment, a virtual routing system and method are able to reconfigure the network within a short period of time after a failure. In several embodiments, a virtual routing system and method provide for quick recovery from failure, do not require additional dedicated hardware as in non-hot standby, and provide for fault tolerant routing without a need to reboot.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Terminology

Brief definitions of terms used throughout this application are given below.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The term "responsive" includes completely or partially responsive.

FIG. 1 is a simplified functional block diagram of a network routing system in accordance with an embodiment of the present invention. Network routing system 100, among other things, may provide hardware-based network processor capabilities and high-end computing techniques, such as parallel processing and pipelining. In embodiment of the present invention, network routing system 100 may implement one or more virtual private networks (VPNs) and one or more associated virtual routers (VRs), and in some embodiments, system 100 may implement hundreds and even thousands of VPNs and VRs. Network routing system 100 may include one or more line interfaces 102, one or more virtual routing engines (VREs) 104, one or more virtual service engines (VSEs) 106, and one or more advanced security engines (ASEs) 108 coupled by switching fabric 110. Network routing system 100 may also include interface 112 which may interface with other routing systems. Network routing system 100 may also include one or more control blades 114 to create VPNs and/or VRs to operate on VREs 104.

In one embodiment, several VPNs and/or VRs may, for example, run on one of processing engines (PEs) 116 of VRE 104. A VPN or VR may be a software context comprised of a set of objects that are resident in the processing engine's memory system. The software context may include the state and processes found in a conventional router, however hundreds or more of these virtual router contexts may be overlaid onto a single processing engine and associated memory system. Accordingly, one of processing engines 116 may provide the context of many VRs to be shared allowing one piece of hardware, such as network routing system 100, to function as up to a hundred or even a thousand or more routers.

Line interface 102 may receive packets of different packet flows from an external network over a communication channel. VREs 104 may perform packet classification, deep packet inspection, and service customization. In one embodiment, VRE 104 may support up to one million or more access control list (ACL) level packet flows. VREs 104 may include a virtual routing processor (not illustrated) to provide hardware assisted IP packet forwarding, multi-protocol label switching (MPLS), network address translation (NAT), differentiated services (DiffServ), statistics gathering, metering and marking. VREs 104 and VSEs 106 may include a virtual service controller (not illustrated) to support parallel processing and pipelining for deep packet inspection and third-party application computing. VSEs 106 may perform parallel processing and/or pipelining, and other high-end computing techniques, which may be used for third party applications such as firewall services and anti-virus services. ASEs 108 may provide for hardware and hardware assisted acceleration of security processing, including encryption/decryption acceleration for IP security protocol type (IPSec) packet flows and virtual private networks (VPNs). Switching fabric 110 may be a high-capability non-blocking switching fabric supporting rates of up to 51.2 Gbps and greater.

Line interface 102 may include a flow manager (not illustrated) to load-balance service requests to VSEs 106 and VREs 104, and may support robust priority and/or weighted round robin queuing. In one embodiment, the flow manager may provide for service load balancing and may dynamically determine one of VREs 104, which may best handle a certain packet flow. Accordingly, all packets of a particular flow may be sent to the same VRE 104. Line interface 102 may identify one of the VREs to process packets of a packet flow based on a physical interface and virtual channel from which the packets of the packet flow were received. The identified VRE may perform ingress metering, header transformation and egress metering for packets of the packet flow. In one embodiment, hardware based metering and marking using a dual token bucket scheme assists in rate-control capabilities of system 100. This may allow for granular application level support and the ability to provide strong performance based service level agreements (SLAs).

Different packets may take different paths through network routing system 100 and may not necessarily require the resources of all the various functional elements of network routing system 100. In one embodiment, a packet, such as a virtual local area network (VLAN) Ethernet packet, may arrive at an input port of line interface 102. The input port may be a gigabit Ethernet input port, which may be one of several input ports. The flow manager may program a steering table look-up to determine which VLAN is associated with a particular one of VREs 104. The flow manager may tag the packet with an internal control header and may transfer the packet from line interface 102 across switching fabric 110 to the selected VRE 104. A service controller of VRE 104 may perform deep packet classification and extract various fields on the packet header. A flow cache may be looked up to determine whether the packet should be processed in hardware or software. If the packet is to be processed in hardware, an index to the packet processing action cache may be obtained.

The packet may be deposited via a high-speed direct access memory (DMA) into the VRE's main memory. A routing processor may retrieve the packet, identify the packet processing actions and may perform actions, such as time-to-live decrementation, IP header and checksum updating, and IP forwarding patch matching. Egress statistics counters may also be updated. The packet may be forwarded to one of ASEs 108 for security operations. The packet may also be forwarded to another one of VREs 104.

In accordance with embodiments of the present invention, control blade 114 provides for redundancy and failover of the virtual routers instantiated by objects running on processing engines 116 of VREs 104. In one embodiment, control blade 114 may detect a failure of one processing engines 116, and may identify the VPNs and/or VRs operating on a failed processing engine. Control blade 114 may also identify a set of command lines corresponding with the identified VPNs and VRs, and replay the set of command lines with an identity of a new processing engine to recreate the identified VPNs and VRs on the new processing engine. This is described in more detail below.

Although system 100 is illustrated as having several separate functional elements, one or more of the functional elements may be combined and may be implemented by combinations of software configured elements, such as processors including digital signal processors (DSPs), and/or other hardware elements.

Figure 2:
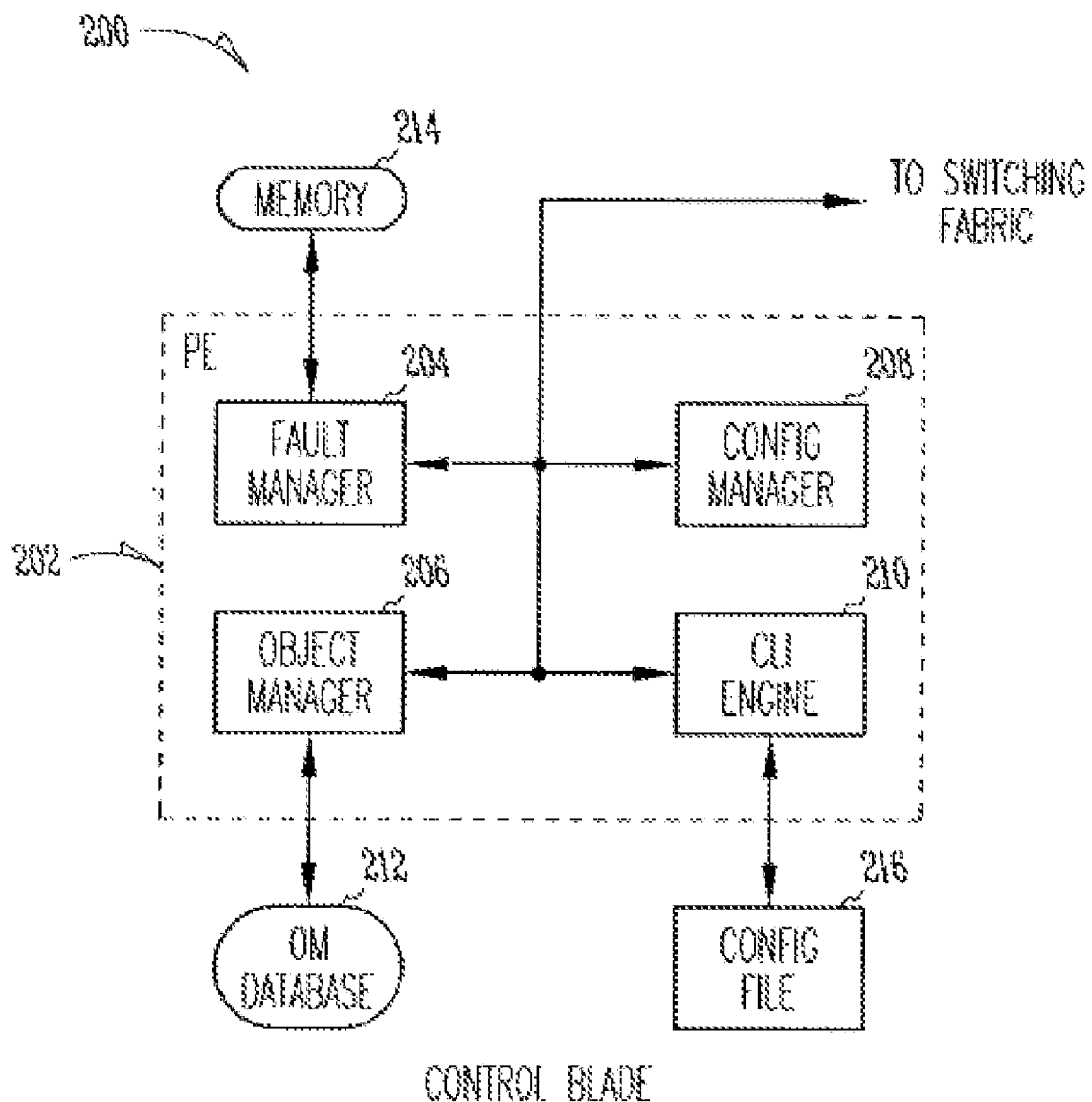
FIG. 2 is a simplified functional block diagram of control blade in accordance with an embodiment of the present invention.

FIG. 2 is a simplified functional block diagram of control blade in accordance with an embodiment of the present invention. Control blade 200 may be suitable for use as control blade 114 (FIG. 2) although other control blades and systems may also be suitable. Control blade 200 may be comprised of one or more processing engines 202, which may be configured to operate fault manager 204, object manager 206, configuration manager 208 and command line interface (CLI) engine 210.

Configuration manager 208 may request the creation of one or more VPNs and associated VRs, which may be defined by objects, and object groups as further described below. Object manager 206 manages the objects that define particular VPNs and VRs. In one embodiment, fault manager 204 may monitor keep-alive messages from one or more processing engines of VREs 104 (FIG. 1) to detect failures of one or more processing engines. Fault manager 204 may query object manager 206 for a list of VPNs and VRs operating on the failed processing engine. Fault manager 104 may identify the failed processing engine to object manager 206 by a slot ID and processing engine ID. The slot ID may identify a particular one of a plurality virtual routing engines (VREs) located at a particular chassis slot of system 100 (FIG. 1). The processing engine ID may identify a particular one of the processing engines of the identified VRE. Object manager 206 may query object manager database 212 to generate a list of VPNs and VRs affected by the failed processing engine. After fault manager 204 receives the list of VPNs and VRs affected by the failed processing engine, fault manager 204 may store the list in memory 214, and may identify a new or backup processing engine to replace the failed processing engine. Fault manager 204 may provide the list to CLI engine 210, along with information to identify the new and failed processing engine. This identity information may include, for example, the slot ID and processing engine ID of the new and failed processing engines. CLI engine 210 may find a set of command lines in configuration file 216 that correspond with the affected VPNs and VRs and the slot ID and processing engine ID of the failed processing engine. CLI engine 110 may replay the matching command lines with the slot ID and processing engine ID of the new processing engine substituted for the failed processing engine, which may activate the identified VPNs and VRs on the new processing engine. In this way, objects that instantiate the VPNs and VRs on the failed processing engine are reconstructed on a new processing engine.

Although control blade 200 is illustrated as having several separate functional elements, one or more of the functional elements may be combined and may be implemented by combinations of software configured elements, such as processors including digital signal processors (DSPs), and/or other hardware elements.

Figure 3:
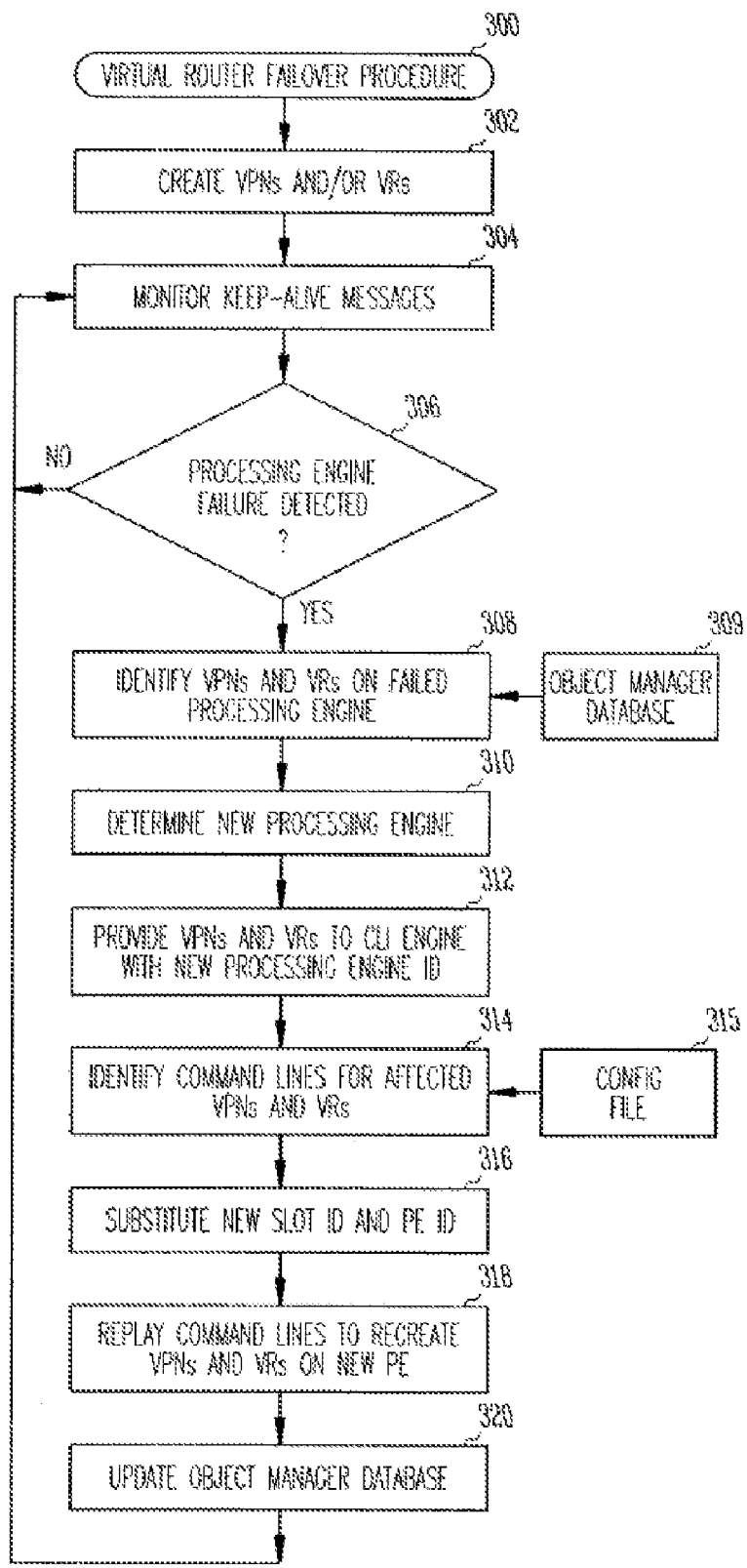
FIG. 3 is a flow chart of a virtual router failover procedure in accordance with an embodiment of the present invention.

FIG. 3 is a flow chart of a virtual router failover procedure in accordance with an embodiment of the present invention. Procedure 300 may be performed by a control blade, such as control blade 200 (FIG. 2), although other systems and control blades may also be suitable for performing procedure 300. Procedure 300 may be used to create VPNs and VRs on a network routing system, such as network routing system 100 (FIG. 1) and provides for automated recovery of VPNs and VRs that are operating on a failed processing engine. Although the individual operations of procedure 300 are illustrated and described as separate operations, one or more of the individual operations may be performed concurrently and nothing requires that the operations be performed in the order illustrated.

In operation 302, VPNs and associated VRs may be created. Each VPN and VR may be defined by one or more objects and object groups, which may be identified for a particular VPN and VR in an object manager database. A configuration manager, such as configuration manager 208 (FIG. 2) may request the creation of one or more VPNs and VRs by object manager 206 (FIG. 2). A CLI engine, such as CLI engine 210 (FIG. 2) may generate a configuration file containing portions for each VPN and VR to be instantiated on a processing engine, such as one of processing engines 116 (FIG. 1). Operation 302 may also include executing the configuration file to instantiate the VPNs and VRs on the processing engines.

In operation 304, a fault manager, such as fault manager 204 (FIG. 2) may monitor messages from the processing engines operating the VPNs and VRs to detect a failure. In one embodiment, the fault manager monitors keep-alive messages from the processing engines. The keep-alive messages may be viewed as heart beats generated by each processing engine on a regular basis and may be communicated between the various processing engines and the control blade in a peer-to-peer networking arrangement through a switching fabric, such as switching fabric 110 (FIG. 1).

In operation 306, when a processing engine failure is detected, operation 308 is performed. When operation 306 does not detect a processing engine failure, operation 304 continues to monitor the keep-alive messages until a processing engine failure is detected. Although not illustrated as separate operations of procedure 300, the network routing system may concurrently operate VPNs and VRs during the performance of the various operations of procedure 300.

In operation 308, the fault manager may query an object manager, such as object manager 206 (FIG. 2) for a list of VPNs and VRs operating on the failed processing engine. The object manager may generate the list using object manager database 309, which may correspond with object manager database 212 (FIG. 2). In operation 310, a new processing engine may be identified to replace the failed processing engine. In one embodiment, a replacement processing engine may be pre-determined during the creation of VPNs and VRs in operation 302, and may be identified in the object manager database as a backup for the failed processing engine.

In operation 312, the fault manager may provide a list of VPNs and VRs identified by the object manager to a command line interface engine, such as CLI engine 210 (FIG. 2). As part of operation 312, the fault manager may also provide information identifying the failed processing engine and new processing engine to the CLI engine. The identity information of a processing engine may include a slot ID and PE ID which identifies the blade location, such as a particular VRE 104 (FIG. 1) and particular processing engine on the blade.

In operation 314, the command line interface engine may identify a command line set from a configuration file corresponding with the particular VPNs and VRs for the failed processing engine. In operation 316, the command line interface engine may substitute the slot ID and PE ID of the new processing engine for that of the failed processing engine in the command line set identified in operation 314. In operation 318, the command line interface engine may replay (e.g., execute) the identified command line set with the new slot ID and PE ID to recreate the VPNs and VRs on the new processing engine.

In operation 320, the object manager database may be updated to correlate the particular VPNs and VRs as operating on the new processing engine. After the completion of operation 320, the routing system may continue to operate the VPNs and VRs accordingly and monitor keep-alive messages in accordance with operation 304.

Embodiments of the present invention provide for fault-tolerant routing. Fault tolerant routing may be viewed as providing reliable packet delivery between nodes in the network connected by a functional physical path. Interconnected networks vary in the number of redundant paths they provide between nodes. Three basic classes of faults that may be considered include link failure, processor node failure, and virtual router failure. Link failures refer to faults in the physical network link between routers. This class of fault includes physical failures caused by the unplugging of a routing cable or the unseating of a router board from the chassis. Link failure resulting in either the corruption of data or the loss of communication between routers may be easily detected. A link that is found to be faulty may be removed from service, and a redundant link if any may be activated and put into service. Processor node failures refer to any failure, which may cause a processing node that runs the router software to refuse to accept packets. The node may appear dead to the network when this fault occurs. These faults may be easily detected, although it may not be possible to isolate the fault further than identifying which processing node is faulty. Such failures may reside either in the node itself or the communication coprocessor. A processor node that is found to be faulty may be removed from service, and a redundant node if any, may be activated and put into service.

A virtual router may fail in different ways, each possibly resulting in varying loss of service. A failure in which packets are routed successfully with proper data, but uses an incorrect channel or experiences unnecessary delay may be difficult to detect because such behavior is within the realm of normal operation. Fortunately, such failures may not be catastrophic because they do not result in corruption or loss of data. Some failures may result in certain channels of the router becoming inoperable, and may appear to be the same as link failures and be treated as such. Furthermore, a router may fail to operate at all. This may be the most severe form of fault in the network because this fault may render all network links to the router inoperable and may isolate the attached processing node from the rest of the network.

Figure 4:
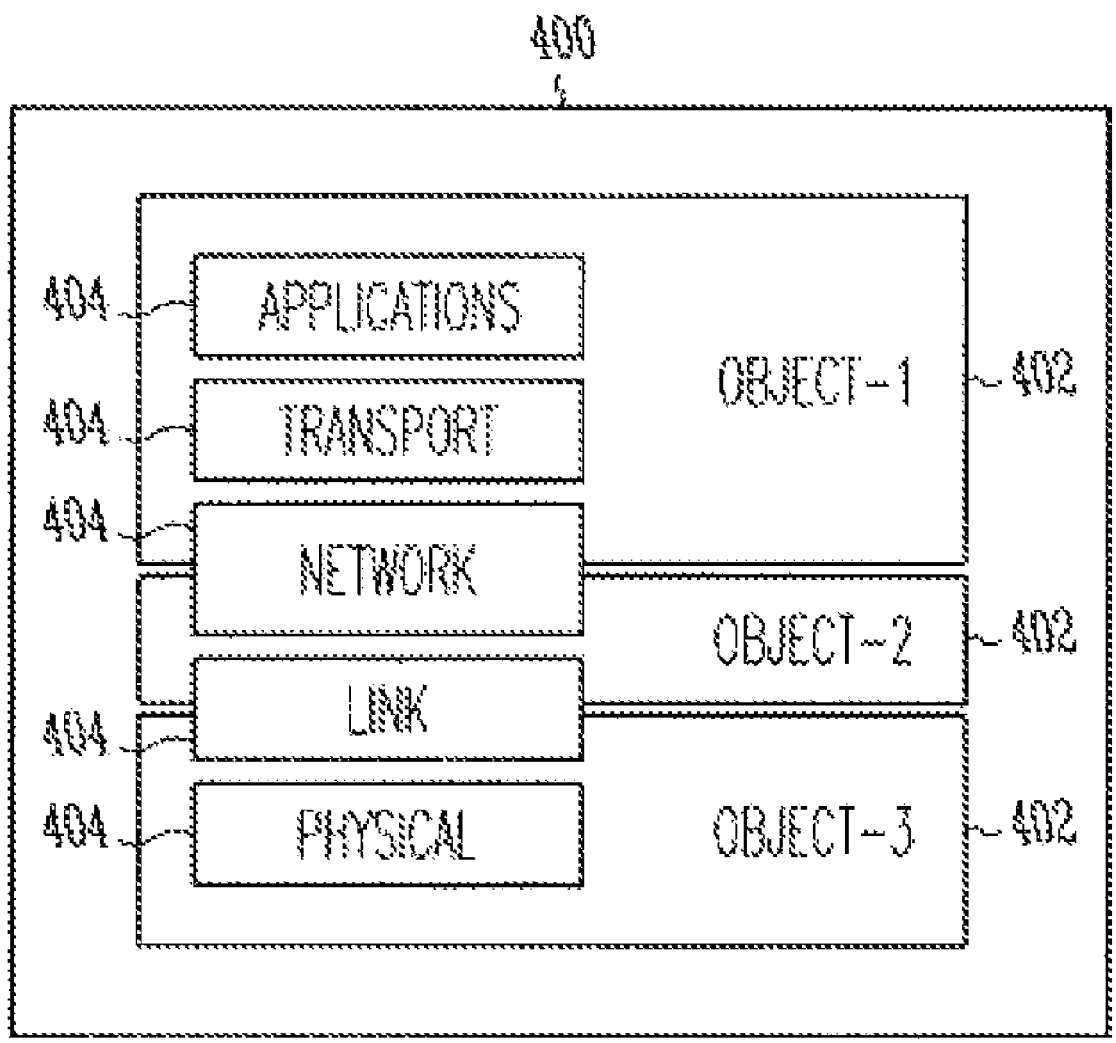
FIG. 4 illustrates an example distribution of protocol modules within objects in accordance with an embodiment of the present invention.

FIG. 4 illustrates a possible distribution of protocol modules within objects in accordance with an embodiment of the present invention. Embodiment of the present invention may implement objects within the various elements of system 100 (FIG. 1). Objects may encompass protocol modules and networking services. Objects may enable the implementation of a VPN and VR. Each VR may comprise a set of objects that provide routing and network services. This may allow the operation of multiple protocol stacks within a single address space with isolation between VRs. Objects may be viewed as containers for modules. Distribution 400 includes objects 402 which represent a basic unit of management for purposes of fault tolerance, computational load balancing etc. One or more adjacent protocol modules 404 may reside in a single object. It is also possible that a module is split across two objects. Collections of objects (e.g. Object-1, Object-2 and Object-3 may be related by the module relationships that they encompass. Such collections of objects may be referred to as object groups.

Figure 5:
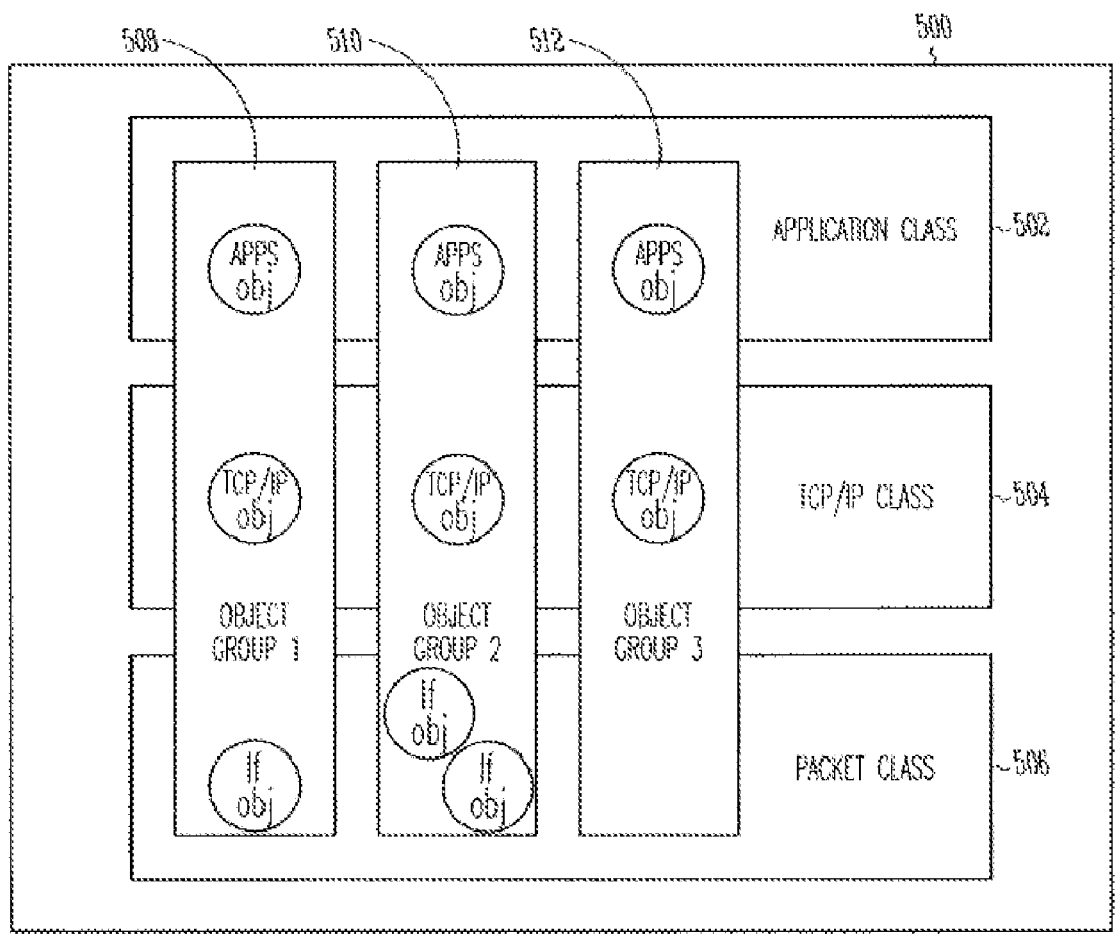
FIG. 5 illustrates a distinction between an Object Class and an Object Group in accordance with an embodiment of the present invention.

FIG. 5 illustrates a distinction between an object class and an object group in accordance with an embodiment of the present invention. Both are a collection of objects. An object class may be a set of objects that have the same type signature and behavior. Distribution 500 is illustrated with applications object class 502, TCP/IP object class 504 and interface object class 506. However, for an object group, the constituent objects do not necessarily have the same type signature and behavior (e.g. object groups 508, 510 and 512). There may be multiple objects of the same class in an object group. For example, object group 510 has two objects of interface object class 506. On the other hand, an object group need not have an object of each class. For example, object group 512 does not have an object of interface object class 506. All objects may be managed by object manager 204 (FIG. 2), which may reside control blade 114 (FIG. 1), which is a management blade of system 100. Control blade 114 (FIG. 1) may also be responsible for the creation and deletion of objects driven by the text-based configuration.

An object of system 100 may not relate directly to a VR component. Multiple objects may correspond to a single component, just as a single object may correspond to multiple components. A VR, for example, may be composed of more than ten objects. Creating a VR may result in the creation of all objects and its components. VR component creation is dynamic, thus a VR may include only of the minimum set of classes of objects that may be required to realize all the components that are provisioned for the VR.

Network communication services may require processing platforms that afford high performance while reducing the cost of equipment and application development. In particular, networking systems should be able to continue operating in the presence of equipment failure. Embodiments of the present invention provide distributed object-oriented network-processing platform including software, which concurrently runs several objects. Each concurrently running object may be viewed as an object instance that encapsulates data and their functions with an independent execution unit. These concurrent objects provide services by communicating with each other without knowing each other's physical locations or internal structures. Each node may be multiple objects, network operating system, and a real-time kernel. The distributed processing platform provides a fault-tolerant mechanism in which fault-tolerant objects may be handled flexibly, with its internal structures hidden and indicated by logical IDs and the execution overhead for fault tolerance may be minimized.

In accordance with an embodiment, the execution units (e.g., the objects) may be replicated and managed in the platform by means of a passive replication approach. Object manager 206 (FIG. 2), for example, may use pseudo objects to manage these passive replicas. The pseudo object may not be the actual object, but instead may be an object image created by the actions of the platform.

Fault tolerance may utilize replication. Replication may allow local access to a resource and may provide a network routing system with an aggregate computing power, that is, the overall computation from all processors taken as a whole. Furthermore, replication may also offer better availability since even though one or more replicas are unavailable, services may be available from the up replicas. Since failures of processors can cause the partial or total loss of system functionality, a level of availability needs to be supported. The fault tolerant system of embodiments of the present invention allows the failure of processors and enhances availability by masking the failure of the master processor to a new processor. Failed processors may be excluded from the set of processors by a failure detection protocol.

With fault tolerance based on replication, there may be a trade-off problem between the overhead of ordinary execution and the recovery time. Two methods for managing the replicas include active replication and passive replication. With active replication, recovery from failures may be quick, but requires large overhead in ordinary execution. With passive replication, recovery may be slower, but resources may be used more efficiently. Active replication conventionally uses a redundant structure consisting of two processor resources and associated memory. One problem with active replication is that because all the replicas must be pre-created when the system is running, the processor resources are used wastefully. Another problem with active replication is that because it complicates object management, flexible management and flexible construction are difficult. With recent gains in processor performance, the fault recovery time with passive replication may be significantly be shortened, and may even exceed that of active replication. In addition, passive replication may solve the problems of active replication while effectively managing processor resources. Accordingly, passive replication supports the development of a large-scale system.

In accordance with embodiments of the present invention, in the case of a blade-level failover (i.e., one of VREs 104 FIG. 1) in which all PEs 116 of a particular blade fails, the blade may reboot and all affected VRs may be recreated on backup PEs. In the case of a PE-level failover, (i.e., if one or more of PEs 116 fails), affected VPNs and VRs may be recreated on a backup PEs. This is described in more detail below.

In accordance with embodiments of the present invention, two substantially identical processor engines may be used to create a primary and a secondary PE system that may run multiple instances of virtual routers and services. Both primary and secondary PEs may consume the same input information, and both connect to the same outputs, though only the primary may be active and controlling those outputs. Both processor engines may be are linked to the same ring network. This allows them to maintain synchronous communication with each other including the management processor engine. When the primary is no longer capable of control due to an internal fault or communication loss, the standby takes over and runs with configuration identical to that on the primary. There are cases where service provider dedicates a single access or trunk blade to their golden customer. To provide resilient network services to this type of customer, a backup blade may be provided that may help ensure continuous operations, even if some devices completely fail. In the blade backup system, two substantially identical blades may be used to create a primary and a secondary blade system that may run multiple instances of virtual routers and services. A blade may comprise multiple processor engines and network modules. If the primary blade becomes non-operational due to internal fault or communication loss in one of the processor engines, the standby blade takes over and runs with configuration identical to that on the primary blade. Embodiments of the present invention may allow a user to specify any available processor when configuring a primary processor engine with a secondary processor engine.

In accordance with embodiments of the present invention, to perform PE failover, a primary-backup pair of processors may be determined prior to creating VPN and VR. The primary-backup pair may be created either through command line interface or GUI-based management interface. Any type of processor engine may be suitable as a standby as long as it is compatible with the primary processor engine. The system may disallow the use of incompatible processor engine as a standby. Once both primary and standby PEs are configured, the fault manager may set the primary PE redundancy state to a primary-active state and the standby PE may be set to a standby state. PEs that are active (e.g., created with VPNs/VRs) but configured without a hot-standby PE may have a redundancy state set to active. PEs that are not active may have a state set to idle.

Figure 6:
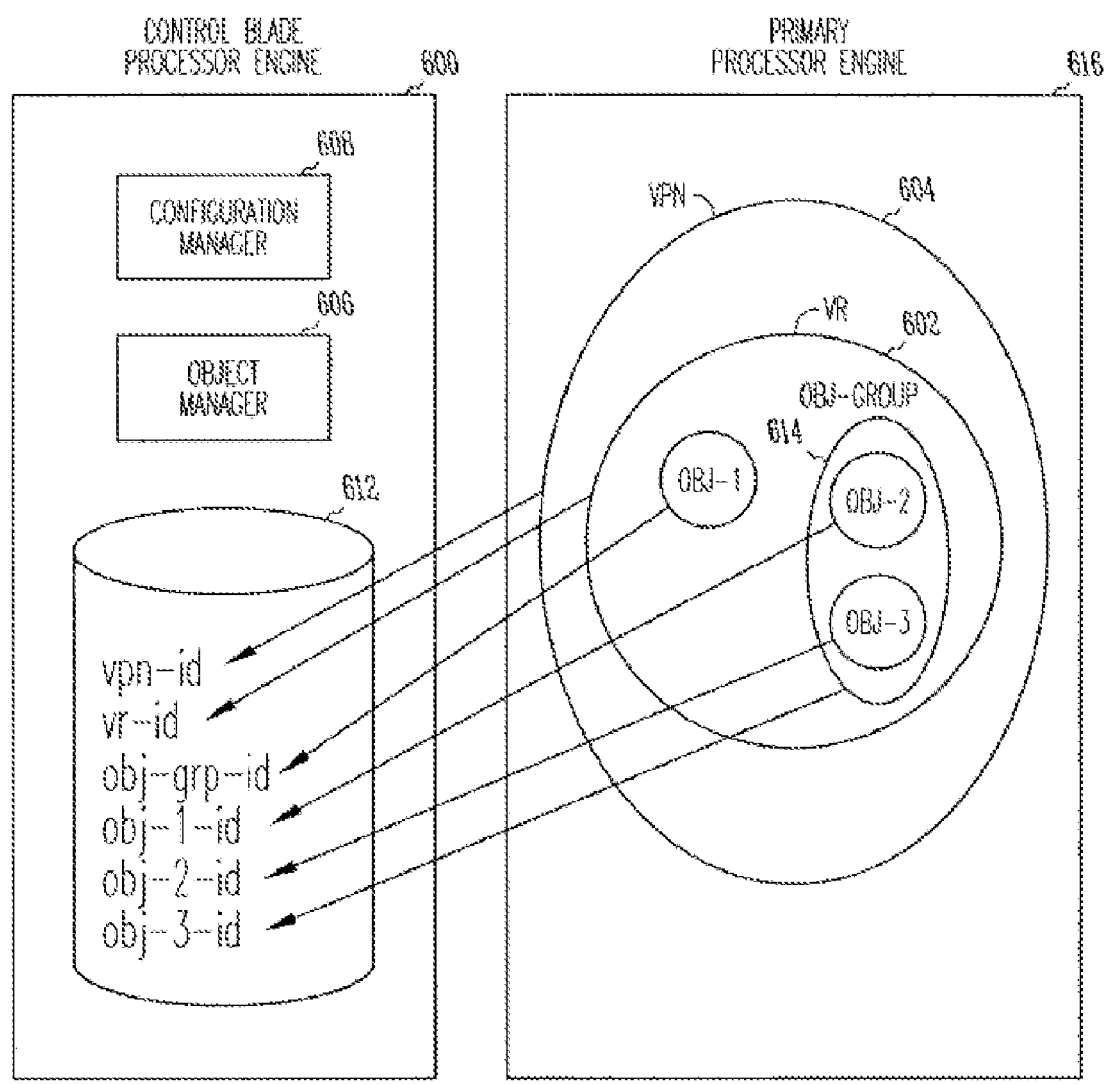
FIG. 6 illustrates VPN and VR replication using remote object references in accordance with an embodiment of the present invention.

FIG. 6 illustrates VPN and VR replication using remote object references in accordance with an embodiment of the present invention. VPN/VR object may be replicated as follows: Configuration manager 608 may be an agent that resides in control blade 600 drives the creation of a VPN 604 and/or VR 602, and services within VR 602. A VR, such as VR 602, may be an object group 614 and may an aggregation point for all objects that comprises the VR. A model of replicated object management provides a way of maintaining information about replicated objects in a consistent manner. Remote object references based on IDs (e.g., vpn-id, vr-id, obj-grp-id and object id) may be used. These IDs may allow for distributed object identification. The remote object references are stored in OM database 612 and may be used by configuration manager 608 to manage VPN and VR information query and dynamic VR creation. These remote object references may be used to recreate VPNs and VRs, and their components during PE failover. Object manager 606 may be a module that manages the VPN and VR objects and object groups. Object Manager 606 may create a VPN descriptor every time the configuration manager request VPN creation. Every VPN may be identified by a unique VPN ID. A VR may be identified by a VR ID, which may be the IP Address of the VR. The VR ID may be unique in the VPN context. In one embodiment, objects may be identified using an obj-group-id and an object id.

In accordance with embodiments of the present invention, control blade 600 may correspond with control blade 200 (FIG. 2), configuration manager 608 may correspond with configuration manager 208 (FIG. 2), object manager 606 may correspond with object manager 206 (FIG. 2) and object manager database 612 may correspond with object manager database 212 (FIG. 2). In addition, processing engine 616 may correspond with one of processing engines 116 (FIG. 1).

Figure 7:
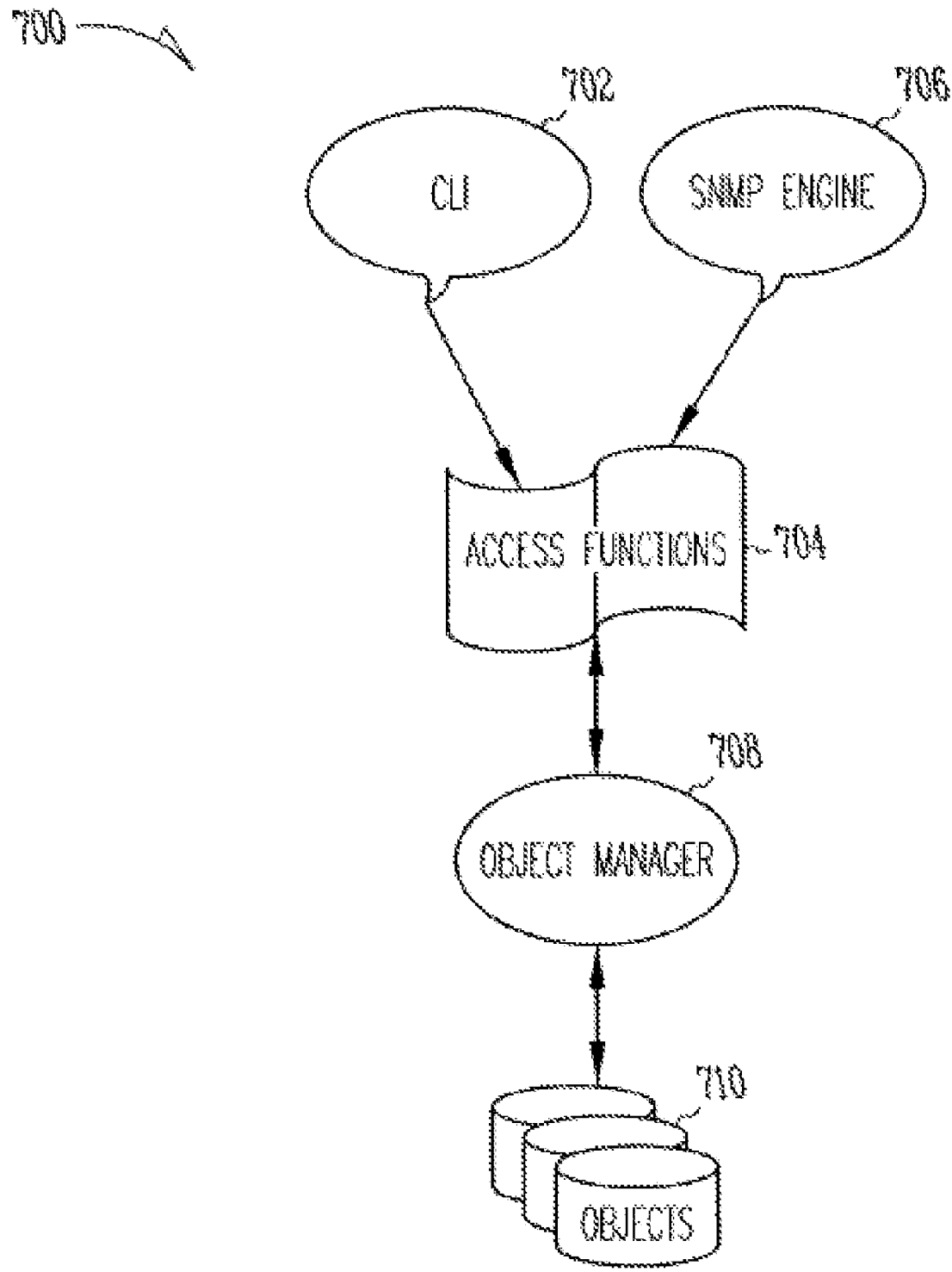
FIG. 7 illustrates a user interface layer showing the saving of VPN and VR information in a configuration file in accordance with an embodiment of the present invention.

FIG. 7 illustrates a user interface layer illustrating the saving of VPN and VR information in configuration file in accordance with an embodiment of the present invention. User interface layer 700 may include command line interface (CLI) 702 which may sit on top of SNMP access functions 704, which may make it in the same level with SNMP engine 706. Accordingly, any configuration that is possible with SNMP may also be done with CLI and vice versa. CLI 702 may use a transaction based commit model. This feature may enables a user to configure and commit configuration on a per object basis instead of per command line used by most CLI on other networking equipments. This may eliminate the possibility of leaving an object in an unstable state due to incomplete configuration. CLI 702 may also communicate with object manager 708 since it deals with objects 710 during VPN and VR creation. Object manager 708, which corresponds with object manager 206 (FIG. 2). In accordance with embodiments of the present invention, CLI 702 may correspond with CLI engine 210 (FIG. 2), and object manager 708 may correspond with object manager 206 (FIG. 2).

FIG. 8 illustrates the layout of the ASCII-text configuration in accordance with an embodiment of the present invention. Object manager 206 (FIG. 2), may store the remote VPN and VR object references in OM database 212 (FIG. 2). When a user invokes a save of the configuration, CLI queries the object manager for VPN and VR object references, may transform the result into ASCII-text information and may save the text output in the configuration file. The use of VPN and VR IDs and the ASCII-text information in the PE failover process is discussed in more detail below.

In one embodiment of the present invention, processor engine failure detection may be implemented using a heartbeat mechanism. A management processor engine, such as fault manager 204 (FIG. 2) that resides in a control blade monitors the health of all processors. The primary PE may periodically send a keep-alive packet to the management PE over a ring network that is marked for internal communication. The management PE raises a failure suspicion event after it detects a number of consecutive missing heartbeats from the primary PE. Once a failure suspicion is raised, a standard voting protocol can be used to confirm that the primary process is out of service, because the primary PE is down, the application process has crashed, or the communication link from the primary is broken. To implement a fast failover system, the failure detection mechanism should detect failures quickly and precisely.

In one embodiment, system 100 may use a distributed messaging layer (DML) for sending keep-alive messages and monitoring processor membership. A tradeoff exists where a tighter deadline for keep-alive message responses can result in false failures. How tight the timeout tolerances can be tuned may be dependent on a number of factors including provisioning and peak load. In one embodiment, a processor engine may send a heartbeat every two seconds and the detection period for a failure suspicion may be 24 seconds (e.g., a total of 12 keep-alive retries). In one embodiment, the keep-alive timeout value may be fixed, and in other embodiments, it may be made customer tunable. Once a primary failure is confirmed, it may generate an event in the management PE for the backup process to take over from the primary.

Figure 9:
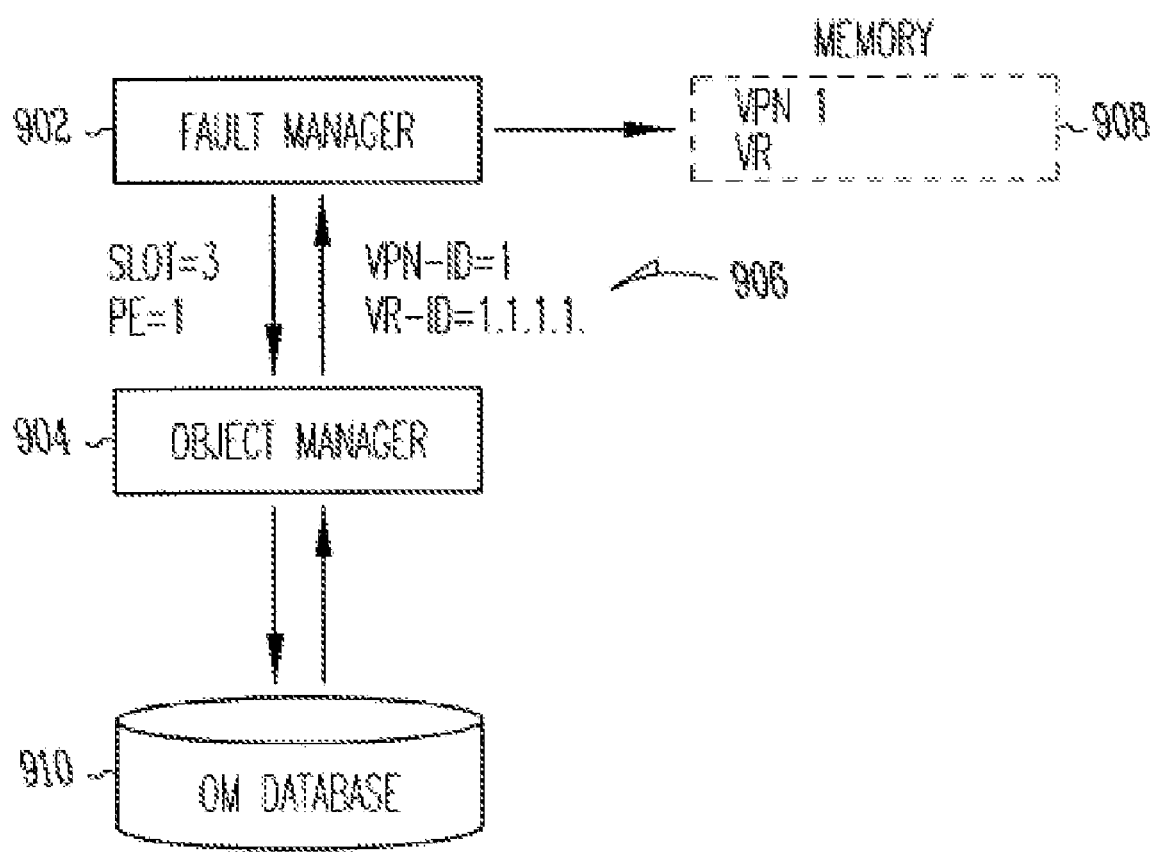
FIG. 9 is a diagram illustrating the generation of a list of VPN & VR IDs present in a primary processor engine in accordance with an embodiment of the present invention.

FIG. 9 is a diagram illustrating the generation of a list of VPN & VR IDs present in the primary processor engine that failed in accordance with an embodiment of the present invention. Once the control blade detects a primary PE failure, fault management 902 may query object manager 904 for list of VPNs and VRs that were created in the failed PE identified by a slot/PE ID. Object manager 904 may query object manager database 910 and return list 906 that includes VPN and VR IDs. Fault manager 902 may save this list in memory 908. FIG. 9 illustrates how the fault manager generates a list of VPN & VR IDs—for example VPN 1 and VR 1.1.1.1 were present in the primary processor engine (slot 3 PE 1) that failed. After the list of affected VPNs and VRs has been generated, fault manager 902 may pass this list to a CLI engine for processing along with the slot/PE ID of the failed PE and slot/PE ID of the new active PE. The list contains VPN & VR IDs. CLI engine uses these IDs and the slot/PE ID of the failed PE to find the set of command lines from the configuration file that correspond to the VPN/VR IDs in the list and the slot/PE ID of the failed PE.

Figure 10:
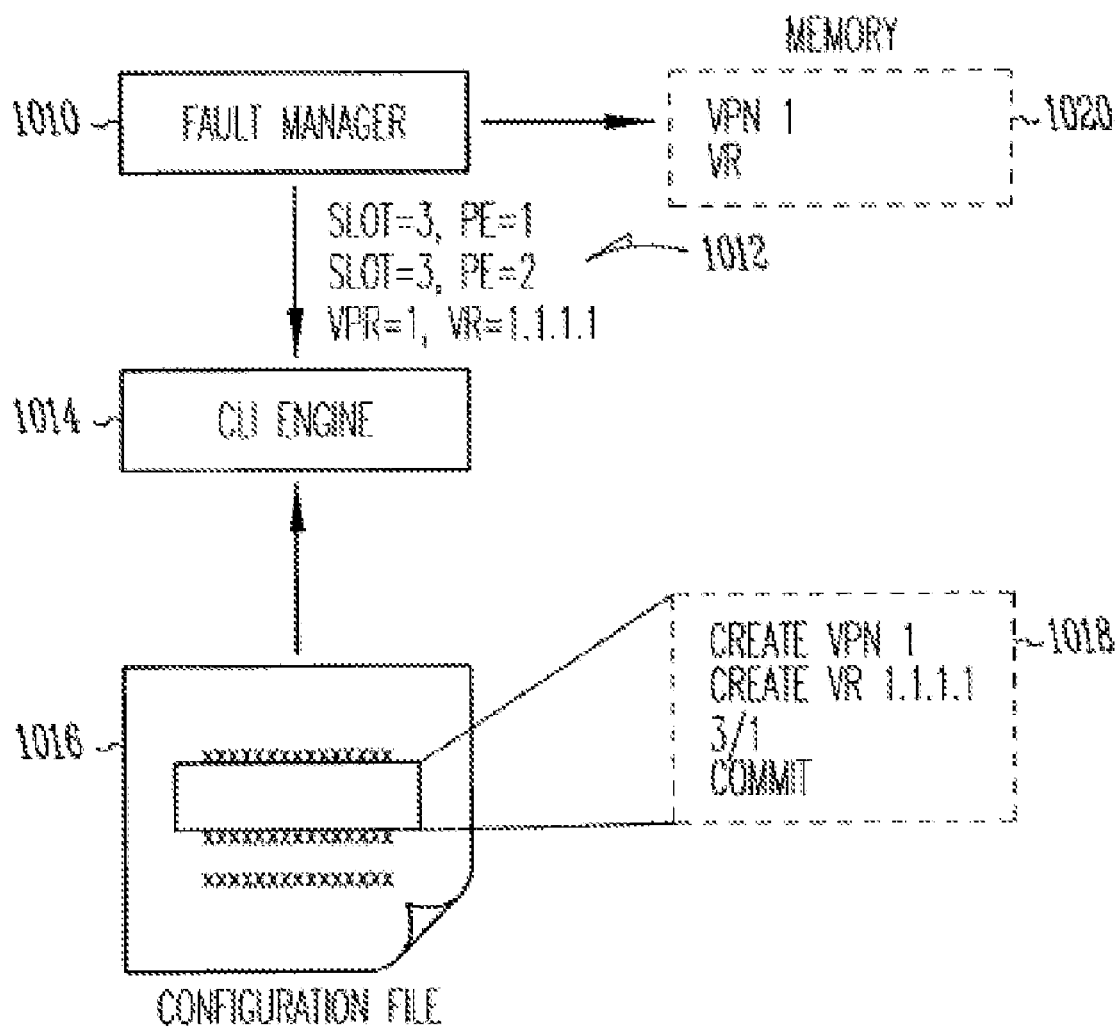
FIG. 10 illustrates an example of a command line interface (CLI) engine using a VPN/VR ID and slot/PE ID of a failed processing engine to find a corresponding command line set in accordance with an embodiment of the present invention.

FIG. 10 illustrates an example of a CLI engine using a VPN/VR ID and slot/PE ID of a failed PE to find a corresponding command line set in accordance with an embodiment of the present invention. In FIG. 10, fault manger 1010 may retrieve the list from memory 1020 and may provide information 1012 to CLI engine 1014. CLI engine 1014 uses the VPN/VR ID and slot/PE ID of a failed PE to fine a corresponding command line set 1018 from configuration file 1016.

Figure 11:
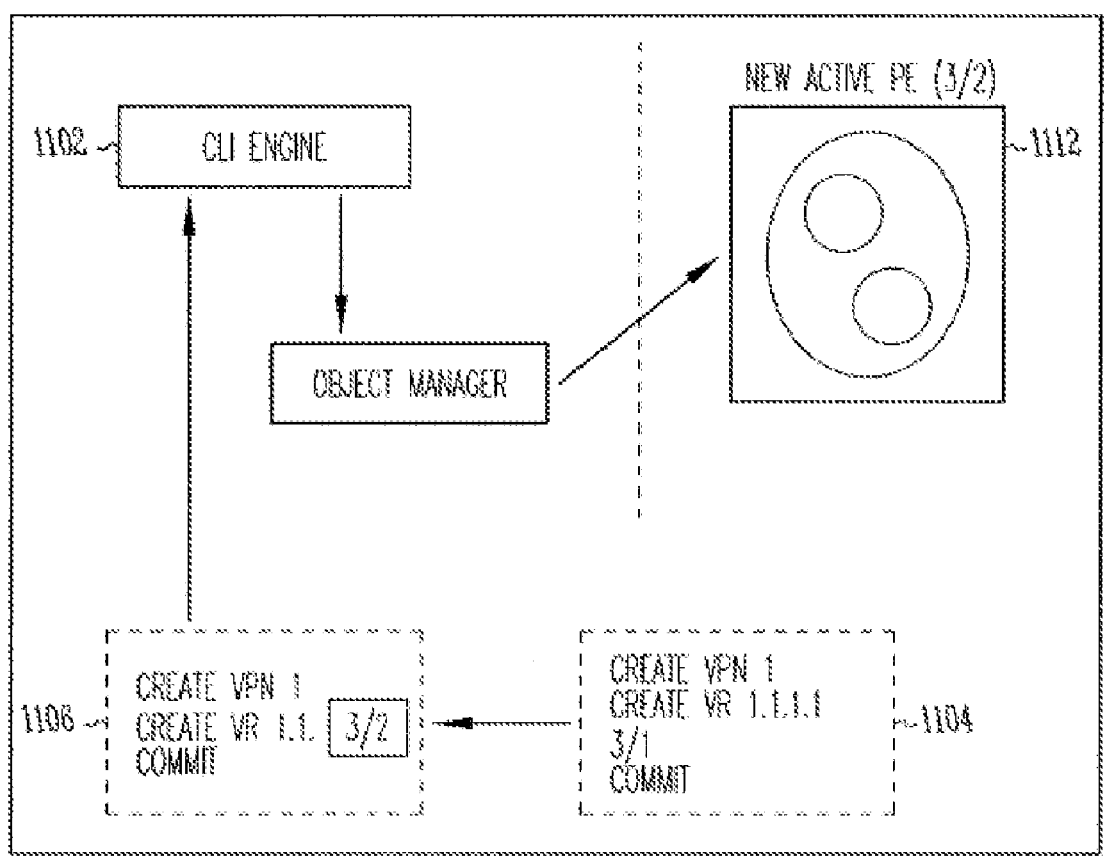
FIG. 11 illustrates a CLI engine replaying a command line set for VPN and VR reconstruction in accordance with an embodiment of the present invention.

FIG. 11 illustrates a CLI engine replaying a command line set for VPN and VR reconstruction in accordance with an embodiment of the present invention. CLI engine 1102 may replay each matching command line, but before it fetches the command string 1104 to the command line processing module 1106 it may substitute the destination slot/PE ID with the ID of the new active PE. Therefore, all VPNs, VRs and VR components may be recreated in the new active PE 1112 after CLI engine 1102 finishes replaying the command line set. Object manager 1114 may manage the new object associations.

Figure 12:
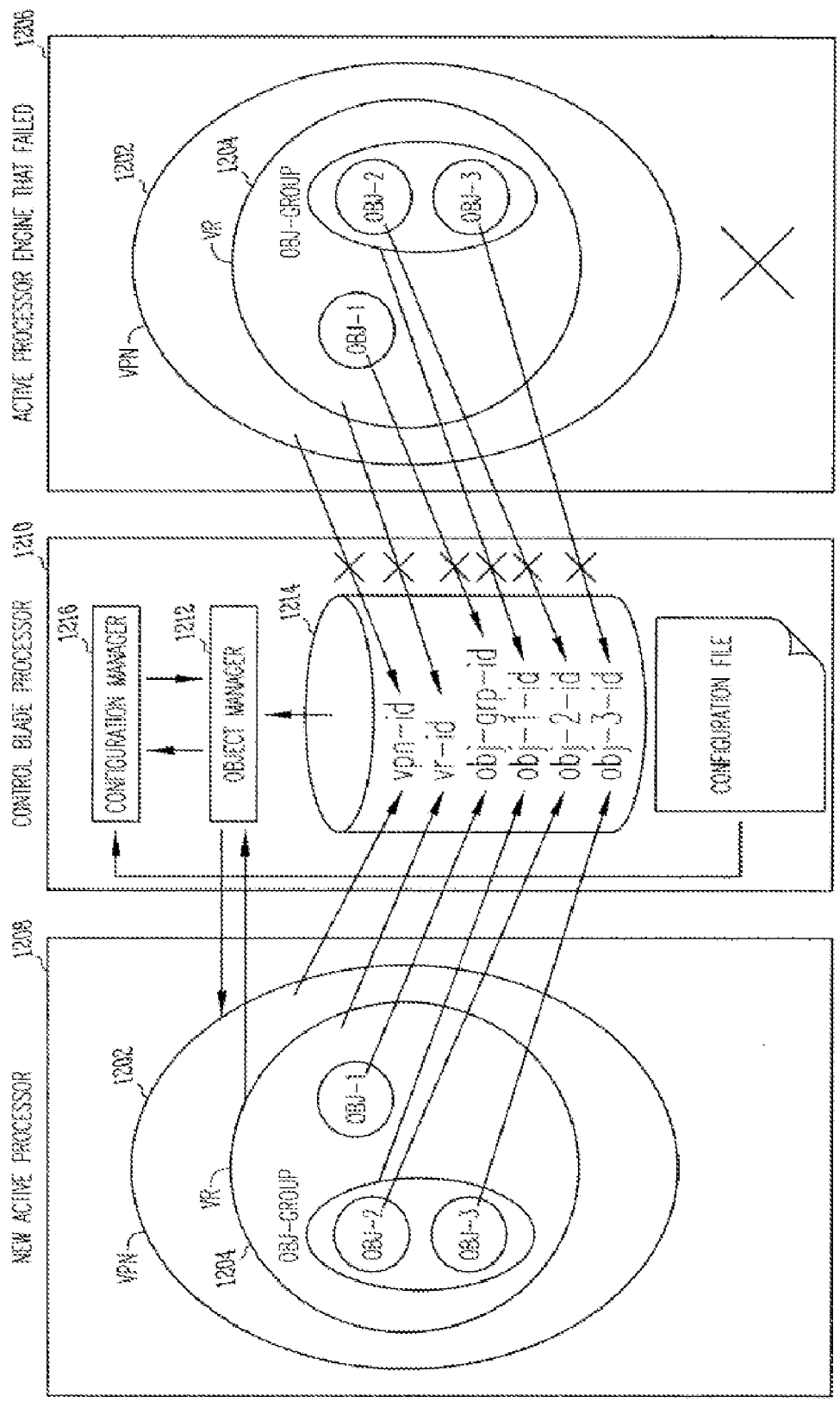
FIG. 12 illustrates VPN and VR object reconstruction during PE failover in accordance with an embodiment of the present invention.

FIG. 12 illustrates VPN and VR object reconstruction during PE failover in accordance with an embodiment of the present invention. Objects and object groups of VPN 1202 and VR 1204 from failed processing engine 1206 are recreated on new processing engine 1208 by a processing engine of control bland 1210. When a fault manager detects a failure of processing engine 1206, object manager 1212 may identify VRs operating on a failed processing engine using object manager database 1214, the command line interface engine may identify a set of command lines from configuration file 1210 corresponding with the identified VRs, and to replay the set of command lines with an identity of a new processing engine to recreate the identified VRs on new processing engine 1208. Configuration manager may manage the new configuration creating the VPNs and VRs.

Figure 13:
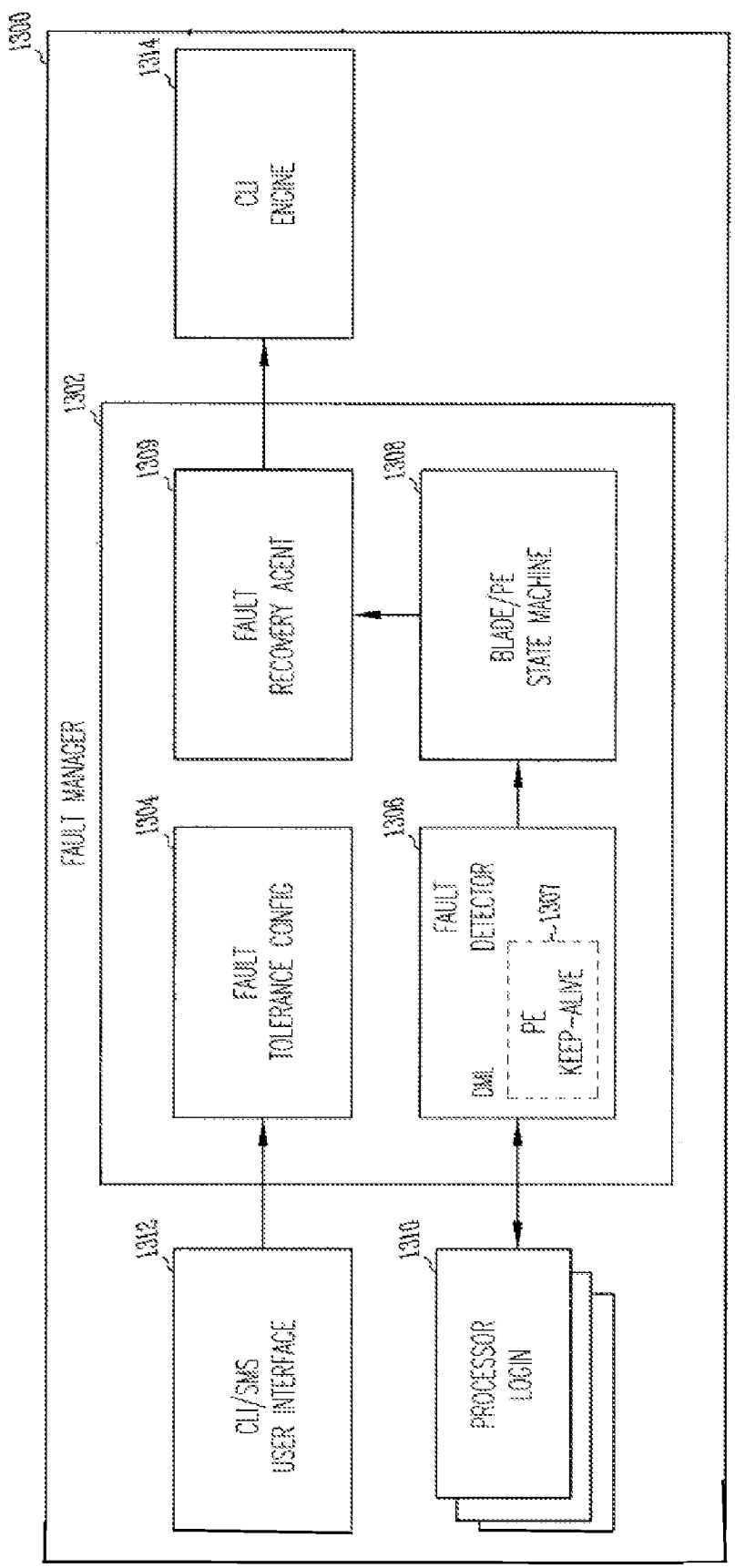
FIG. 13 illustrates a fault management system in accordance with an embodiment of the present invention.

FIG. 13 illustrates a fault management system in accordance with an embodiment of the present invention. The fault management system 1300 may be implemented by fault manager 204 (FIG. 2). Fault manager 1302 may include a fault tolerance (FT) configurator 1304, fault detector 1306, blade/PE state machine 1308, and failure recovery agent 1309. Fault manager 1302 may be capable of scaling to large number of processor engines. Fault manager 1302 may identify faults on processing engines 1310 and may restore affected virtual routers and applications accurately. Fault manager 1302 may identify problems in a timely fashion, so that responses and corrective actions may be taken as soon as possible to meet failover requirements. Fault manager 1302 may utilize low overhead and monitoring so as not to have a significant impact on the performance of virtual routers and application processes. Fault manager 1302 may also support a range of application-specific fault detection policies and usage models. For example, applications may wish to control which entities are monitored, how often they are monitored, the criteria used to report failure, and where failures are reported.

Fault tolerance configurator 1304 may be a module that interfaces with CLI or SMS user interface 1312 to configure the fault tolerance properties. Fault detector 1306 may be a module responsible for monitoring the health of the processor engines 1312 (e.g., through keep-alive messages 1307) and reporting faults. Blade/PE state machine 1308 may be a module is responsible for maintaining the state of blades and processor engines. The fault recovery agent 1309 may be a module that is responsible for processing and interfacing with CLI engine 1314.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising
configuring a plurality of processing engines within a network routing system, the plurality of processing engines including an active processing engine having one or more software contexts and a non-hot-standby processing engine having no pre-created software contexts corresponding to the one or more software contexts; and
responsive to determining a fault associated with the active processing engine, dynamically replacing the active processing engine with the non-hot-standby processing engine by creating replacement software contexts within the non-hot-standby processing engine corresponding to the one or more software contexts.

2. The method of claim 1, wherein the fault comprises a link failure to or from the active processing engine.

3. The method of claim 1, wherein the fault comprises a hardware or software failure associated with the active processing engine.

4. The method of claim 1, wherein one of the one or more software contexts includes a set of objects implementing a virtual router (VR).

5. The method of claim 1, wherein said dynamically replacing the active processing engine with the non-hot-standby processing engines involves use of a network-management protocol.

6. The method of claim 5, wherein the network-management protocol comprises Simple Network Management Protocol (SNMP).

7. The method of claim 1, wherein the fault is detected by a control blade of the network routing system.

8. The method of claim 7, further comprising the control blade monitoring a health of the active processing engine by tracking keep-alive messages received from the active processing engine.

9. The method of claim 1, wherein said dynamically replacing the active processing engine with the non-hot-standby processing engine involves use of a transaction-based commit model.

10. The method of claim 1, wherein the active processing engine and the non-hot-standby processing engine comprise substantially identical processing engines.

11. A method comprising:
responsive to determining the existence of a failed processing engine of a plurality of processing engines of a network routing system, identifying one or more software contexts that were associated with the failed processing engine prior to failure of the failed processing engine; and
dynamically replacing the failed processing engine with a non-hot-standby processing engine of the plurality of processing engines by configuring the non-hot-standby processing engine with one or more replacement software contexts corresponding to the one or more software contexts, wherein prior to the failure, the non-hot-standby processing engine was in a state in which the non-hot-standby processing engine could have replaced one or more others of the plurality of processing engines and was not being actively synchronized with the failed processing engine.

12. The method of claim 11, wherein one of the one or more software contexts includes a set of objects implementing a virtual router (VR).

13. The method of claim 12, wherein a fault indicative of failure of the failed processing engine comprises failure of the VR.

14. The method of claim 13, wherein the fault is detected by a control blade of the network routing system.

15. A computer-readable storage medium tangibly embodying a set of instructions, which when executed by one or more processors associated with a control blade of a network routing system or a plurality of processing engines of the network routing engine cause the one or more processors to:
configure the plurality of processing engines, the plurality of processing engines including an active processing engine having one or more software contexts and a non-hot-standby processing engine having no pre-created software contexts corresponding to the one or more software contexts; and
responsive to determining a fault associated with the active processing engine, dynamically replace the active processing engine with the non-hot-standby processing engine by creating replacement software contexts within the non-hot-standby processing engine corresponding to the one or more software contexts.

16. The computer-readable storage medium of claim 15, wherein the fault comprises a link failure to or from the active processing engine.

17. The computer-readable storage medium of claim 15, wherein the fault comprises a hardware or software failure associated with the active processing engine.

18. The computer-readable storage medium of claim 15, wherein one of the one or more software contexts includes a set of objects implementing a virtual router (VR).

19. The computer-readable storage medium of claim 15, wherein the fault is detected by the control blade.

20. The computer-readable storage medium of claim 19, wherein the control blade monitors a health of the active processing engine by tracking keep-alive messages received from the active processing engine.

* * * * *